May 5, 1925.  1,536,900
A. L. LOWE
LICENSE CARD BRACKET
Filed March 13, 1924
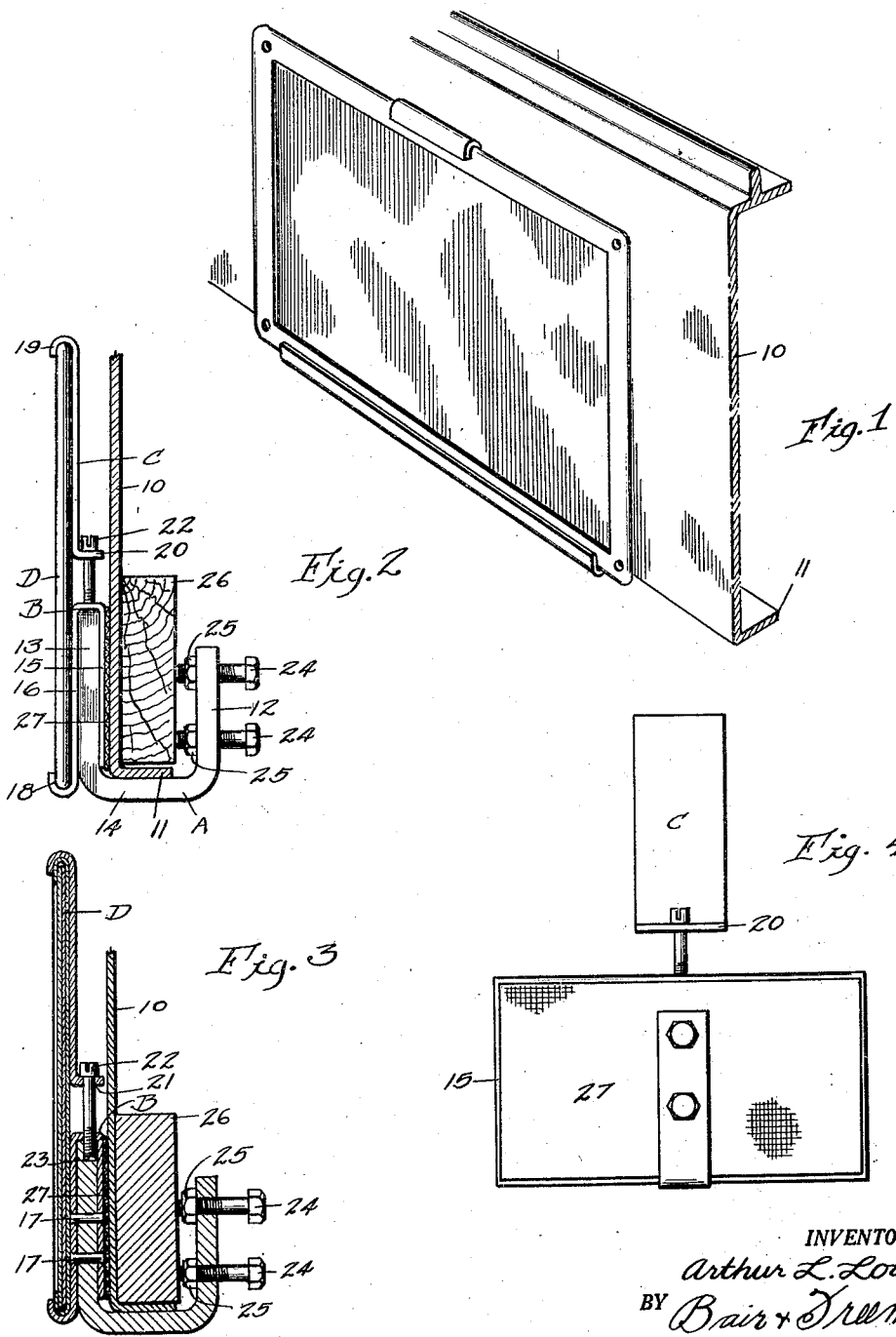
INVENTOR.
Arthur L. Lowe
BY Bair & Freeman
ATTORNEYS.

Patented May 5, 1925.

1,536,900

UNITED STATES PATENT OFFICE.

ARTHUR L. LOWE, OF SIOUX CITY, IOWA.

LICENSE-CARD BRACKET.

Application filed March 13, 1924. Serial No. 698,958.

*To all whom it may concern:*

Be it known that I, ARTHUR L. LOWE, a citizen of the United States, and a resident of Sioux City, in the county of Woodbury and State of Iowa, have invented a certain new and useful License-Card Bracket, of which the following is a specification.

An object of my invention is to provide a bracket for supporting the license cards which are ordinarily carried on the dash of an automotive vehicle.

More particularly my invention contemplates a bracket particularly adapted to support a license card upon the instrument board of the vehicle.

A further object is to provide such a bracket which is substantially hidden from view by the license card holder when installed.

A further object is to provide such a bracket which is of the cheapest possible construction and which is very simple and durable.

Still more in particular it is my purpose to provide such a bracket which will retain the license card holder very securely in place.

With these and other objects in view, my invention consists in the construction, arrangement and combination of the various parts of my device, whereby the objects contemplated are attained, as hereinafter more fully set forth, pointed out in my claims, and illustrated in the acompanying drawings, in which:

Fig. 1 is a perspective view showing a license card holder held by my bracket on the instrument board of a vehicle.

Fig. 2 is a vertical sectional view through the instrument board, the bracket and license card holder being shown in end elevation.

Fig. 3 is a vertical sectional view through the instrument board and the bracket.

Fig. 4 is a rear elevational view of the bracket.

It is required in many States that the license card of an automotive vehicle be carried on the instrument board. It is desirable that the card be so carried in order that it may be most easily seen by anyone who desires to obtain the information which it contains. For instance, a police officer, having occasion very often to look at the license card of a vehicle, will not be unduly inconvenienced when the card is carried upon the instrument board.

In many cars the instrument board is nicely finished in expensive wood, and it is desirable that this finish be not marred by the tacking of a license card holder thereto.

For these reasons, a bracket for supporting the card is very desirable, and one which will not be unsightly and which will secure the card holder firmly in place is very desirable.

My invention in general is designed to solve the problem herein presented by providing a bracket which is ordinarily hidden by the card holder and which is provided with protective material designed to engage the outer surface of the instrument board so as not to mar it.

In Fig. 1 a portion of the instrument board of a Ford car is shown at 10. It is formed of sheet metal and has at the bottom the rearwardly projecting flange, 11. My improved bracket comprises a yoke, A, which is U-shaped, and has the rear upwardly extending arm, 12, the forward arm, 13, and the connecting portion, 14. Fastened to the arm, 13, is an inverted channel-shaped member, B, which is formed of a single rectangular plate of sheet metal, bent to the required shape and received over the arm, 13. The channel-shaped member thus formed has the rear portion, 15, and the forward portion, 16, which are connected by rivets, 17, extended therethrough and through the arm, 13. The lower edge of the portion, 16, is bent upwardly at 18 to form a lower jaw member for receiving the license card holder. A strip of sheet metal forms the upper jaw member, C, and is bent at its upper end, at 19, for this purpose. The lower end, at 20, is bent at right angles to the body of the strip to form a shoulder. In the shoulder, 20, is an opening, 21, through which is received an adjusting screw, 22. The lower end of the screw, 22, is threaded, at 23, into the upper end of the arm, 13. The license card holder, D, is received between the jaws, 18 and 19, and the screw, 22, is rotated in order to clamp the holder firmly in place.

It will be noted that the lower jaw member is substantially the width of the holder, whereas the upper jaw member may be made of a narrow strip of metal so that in effect the holder is clamped at three spaced points for holding it firmly in place.

At the same time, the jaw members are made of single rectangular pieces of metal such that no dies are necessary in cutting them, and the amount of material used is brought to a minimum.

In the arm, 12, are threaded the set screws, 24, and received on the threaded ends of the screws are lock nuts, 25, designed to coact with the inner face of the arm, 12.

When the bracket is applied to an instrument board such as above described, a block of wood, 26, is ordinarily used in order that a proper purchase may be obtained by the clamping mechanism. When the device is to be attached to a thick instrument board such as one wherein the sheet metal is backed by a wooden piece, the block, 26, need not be used.

Securely fixed to the outer face of the member, 15, is a piece of cloth or other fabric, 27, which serves to protect the finish of the instrument board.

It will be noted that the device may be installed very readily by simply adjusting the two set screws and the lock nuts thereon. The license card holder itself conceals all of the bracket except the outer portions of the jaws.

When it is desired to pack the bracket for shipment the member, C, is reversed in position by removing the screw, 22, and letting it press against the member, 15. The set screws may also be removed and reversed so as to be received between the arms of the yoke, A, and yet retained by the arm, 12, by threading into their respective openings.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A license card bracket comprising a yoke adapted to straddle the lower portion of an automobile instrument board, an inverted channel-shaped plate received over the forward arm of the yoke and fixed thereto, the portion of said plate within the yoke being adapted to rest against the instrument board, a strip of protective material fixed to the plate and arranged to be interposed between the plate and the instrument board, the other portion of the plate having a jaw formed on its lower end, an upper jaw, an adjustable screw connection between the upper and lower jaws, and a set screw in the rear arm of the yoke adapted to engage the rear of the instrument board.

2. A license car bracket comprising a yoke adapted to straddle the lower portion of an automobile instrument board, an inverted channel-shaped plate received over the forward arm of the yoke and fixed thereto, the portion of said plate within the yoke being adapted to rest against the instrument board, the other portion of the plate having a jaw formed on its lower end, an upper jaw, an adjustable screw connection between the upper and lower jaws, and a set screw in the rear arm of the yoke adapted to engage the rear of the instrument board.

3. A license card bracket comprising a yoke adapted to straddle the lower portion of an automobile instrument board, an inverted channel-shaped plate received over the forward arm of the yoke and fixed thereto, the portion of said plate within the yoke being adapted to rest against the instrument board, the other portion of the plate having a jaw formed on its lower end, an upper jaw, an adjustable screw connection between the upper and lower jaws, and means for attaching the yoke to the instrument board.

Signed at Sioux City, in the county of Woodbury and State of Iowa, this 29" day of February, 1924.

ARTHUR L. LOWE.